US012802228B2

(12) United States Patent
Lin et al.

(10) Patent No.: US 12,802,228 B2
(45) Date of Patent: Nov. 17, 2026

(54) METHOD, SYSTEM, AND COMPUTER-READABLE RECORDING MEDIA FOR PROCESSING TISSUE IMAGES

(71) Applicant: JelloX Biotech Inc., Hsinchu County (TW)

(72) Inventors: Yu-Chieh Lin, Hsinchu County (TW); Yen-Yin Lin, Hsinchu County (TW); Chia-Jung Lee, Hsinchu County (TW)

(73) Assignee: JelloX Biotech Inc., Hsinchu County (TW)

( * ) Notice: Subject to any disclaimer, the term of this patent is extended or adjusted under 35 U.S.C. 154(b) by 168 days.

(21) Appl. No.: 18/931,073

(22) Filed: Oct. 30, 2024

(65) Prior Publication Data

US 2025/0252572 A1 Aug. 7, 2025

Related U.S. Application Data

(60) Provisional application No. 63/550,591, filed on Feb. 6, 2024.

(51) Int. Cl.
*G06T 7/00* (2017.01)
*G06T 7/12* (2017.01)

(52) U.S. Cl.
CPC .............. *G06T 7/0014* (2013.01); *G06T 7/12* (2017.01); *G06T 2207/10024* (2013.01); *G06T 2207/20081* (2013.01); *G06T 2207/30096* (2013.01)

(58) Field of Classification Search
None
See application file for complete search history.

(56) References Cited

U.S. PATENT DOCUMENTS

| | | | | |
|---|---|---|---|---|
| 2019/0392612 | A1* | 12/2019 | Lemdani | G06T 7/0012 |
| 2023/0084952 | A1* | 3/2023 | Descombes | G06T 7/187 705/2 |
| 2025/0385005 | A1* | 12/2025 | Aghaei | G06V 20/69 |

* cited by examiner

*Primary Examiner* — Kaitlin A Retallick

(57) ABSTRACT

The disclosure relates to the field of image processing technology and provides a method and system for processing tissue images on whole-slide imaging. The method includes: obtaining a target image; obtaining a dataset, enhancing the staining components of the dataset, using the enhanced dataset for federated learning to construct a tumor segmentation model, wherein the dataset includes several test images, and the test images are immunohistochemical images; inputting the target image into the tumor segmentation model to determine a tumor area within the target image; performing cell membrane staining detection on the tumor area, classifying the tumor area based on the integrity of the cell membrane and the level of staining, and grading based on the classification result. The disclosure can more accurately evaluate the level of HER2 in tissue images, optimize target images obtained from different institutions, and achieve cross-institutional model training without compromising user privacy.

9 Claims, 3 Drawing Sheets

METHOD, SYSTEM, AND COMPUTER-READABLE RECORDING MEDIA FOR PROCESSING TISSUE IMAGES

CROSS-REFERENCE TO RELATED APPLICATIONS

This application claims priority of Provisional Application No. 63/550,591, filed on Feb. 6, 2024, the content of which is incorporated herein in its entirety by reference.

FIELD OF THE INVENTION

The present disclosure relates to the field of image processing technology, particularly to a method and system for processing tissue images on whole-slide imaging.

BACKGROUND OF THE INVENTION

The rapid development of precision medicine and personalized healthcare has increased the demand for accurate diagnostic tests. These tests are crucial for implementing new therapies such as targeted treatments. In the existing technology, the processing of target tissue images relies heavily on manual identification, which depends on human experience to determine the gene expression levels in target tissue images. This prior method generally lacks accuracy, and improving the accuracy of image processing is an urgent issue to be addressed.

SUMMARY OF THE INVENTION

In view of this, the present disclosure provides a method and system for processing tissue images on whole-slide imaging, aiming to optimize methods and more accurately evaluate the level or expression of human epidermal growth factor receptor 2 (HER2) in target tissue images than the prior art.

In the first aspect, the present disclosure provides a specific embodiment of a method for processing tissue images on whole-slide imaging, including the following steps:

(a) obtaining a target image;

(b) obtaining a dataset, enhancing the staining components of the dataset, and using the enhanced dataset for federated learning to construct a tumor segmentation model, wherein the dataset includes several test images, and the test images are immunohistochemical (IHC) images;

(c) inputting the target image into the tumor segmentation model to determine a tumor area within the target image; and (d) performing cell membrane staining detection on the tumor area, classifying the tumor area based on the integrity of the cell membrane and the staining level of the cell membrane, and grading based on the classification result.

In some embodiments, the step "obtaining a dataset, enhancing the staining components" further includes the following steps:

obtaining the test images in the dataset, performing color deconvolution on the test images to obtain the color basis and staining intensity of a dye in the test images;

randomly scaling and randomly translating the staining intensity to obtain an enhanced staining intensity;

randomly rotating the color basis of the dye to obtain an enhanced color basis of the dye; and integrating the enhanced staining intensity and the enhanced color basis to complete the staining component enhancement.

In some embodiments, the step "using the enhanced dataset for federated learning to construct the tumor segmentation model" includes the following steps: preprocessing several enhanced datasets and inputting the preprocessing results into a federated learning server to construct the tumor segmentation model. The preprocessing procedure is used to reduce the data volume input into the federated learning server.

In some embodiments, the step "preprocessing several enhanced datasets and inputting the preprocessing results into the federated learning server to construct the tumor segmentation model" further includes the following steps:

constructing a local model and a global model based on the learning rules of the federated learning server;

training the local model with one or several enhanced datasets to obtain the parameters of the local models;

inputting the parameters of the local models into the federated learning server, training the global model through a clustering pipeline; and training the global model with several enhanced datasets, inputting the parameters of the trained global model into the federated learning server to construct the tumor segmentation model.

In some embodiments, Step (d) "performing cell membrane staining detection on the tumor area, classifying the tumor area" further includes the following steps:

(d1) detecting the nuclei within the tumor area to determine the position of the nuclei;

(d2) performing cell membrane detection based on the position of the nuclei to determine the position of the cell membrane corresponding to the nuclei;

(d3) classifying the cell membrane based on the staining level to obtain a pre-classification result; and (d4) classifying the tumor area based on the pre-classification result and the integrity of the cell membrane.

In some embodiments, Step (d2) "performing cell membrane detection based on the position of the nuclei to determine the position of the cell membrane corresponding to the nuclei" further includes the following step: expanding the segmentation mask of the nucleus based on the position of the nucleus to determine the position of the cell membrane corresponding to the nucleus.

In some embodiments, Step (d3) "classifying the cell membrane based on the staining level to obtain a pre-classification result" further includes the following steps: performing color deconvolution on each pixel of the cell membrane to convert it to a hematoxylin (H&E)-diaminobenzidine (DAB) representation;

classifying each pixel of the cell membrane based on its staining intensity in the diaminobenzidine channel according to a preset threshold to obtain the classification level of each pixel; and obtaining the pre-classification result based on the classification level of each pixel.

In some embodiments, Step (d4) "classifying the tumor area based on the pre-classification result and the integrity of the cell membrane" further includes the following steps: using a skeletonization algorithm to obtain the integrity of the cell membrane; and refining the pre-classification result based on the integrity of the cell membrane to classify the tumor area.

In some embodiments, grading based on the classification result includes using preset standards such as the ASCO CAP 2018 guidelines to evaluate the expression level of HER2 in the target image.

In the second aspect, the present disclosure also provides a specific embodiment of a tissue image processing system on whole-slide imaging, including a memory, a processor, and a computer program stored on the memory, wherein the processor executes the computer program to implement the steps of the method in the first aspect.

In the third aspect, the present disclosure also provides a specific embodiment of a computer program product, including a computer program/instructions, wherein the computer program/instructions, when executed by a processor, implement the steps of the method in the first aspect.

Compared to the prior art, the present application has at least the following beneficial effects or unexpected results: 1. they can accurately evaluate the expression level of HER2 in the target image; and 2. they can optimize target images obtained from different institutions, achieving cross-institutional model training without compromising user privacy.

BRIEF DESCRIPTION OF DRAWINGS

One or more specific embodiments are shown in the accompanying drawings by way of example and not by way of limitation. The accompanying drawings are not to scale unless otherwise disclosed. The present disclosure should be understood by those of ordinary knowledge in the art in light of the following detailed description of preferred specific embodiments and with reference to the accompanying drawings.

The above features, technical characteristics, advantages, and their realizations of the present disclosure will be further described below in a clear and easy-to-understand manner in conjunction with the illustrations of the preferred specific embodiments.

DETAILED DESCRIPTION OF THE INVENTION

Figure 1:
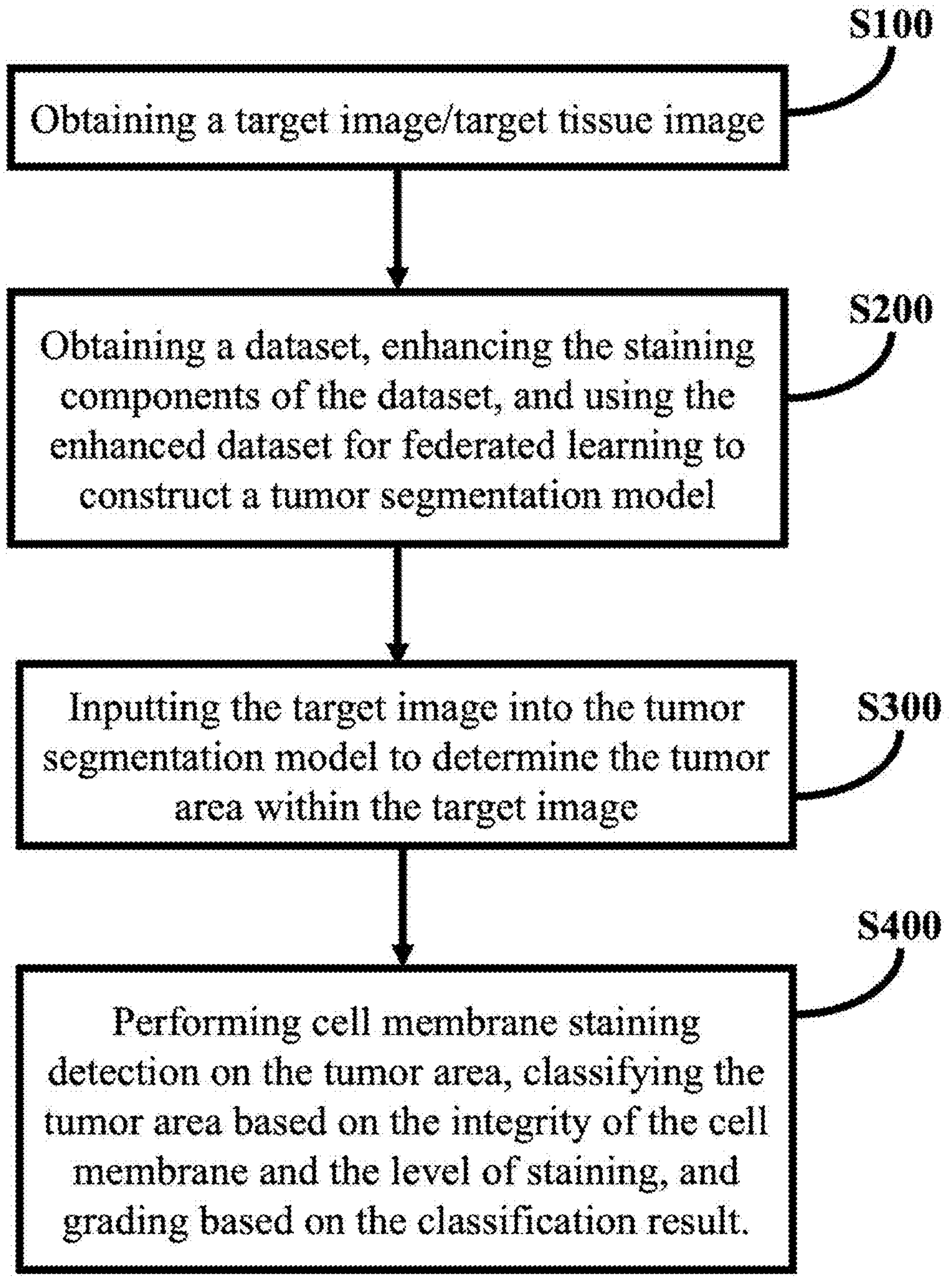
FIG. 1 is a schematic diagram of a fully loaded slide tissue image processing method in the embodiment of the present invention.

To more clearly illustrate the technical solutions of the embodiments of the present application, the specific implementations will be described below with reference to the accompanying drawings. The drawings described in the following are only some of the embodiments of the present application. For those of ordinary skill in the art, other drawings can be obtained based on these drawings without any creative effort, and other embodiments can be obtained. Any modifications and improvements made without departing from the spirit of the present application are within the protection scope of the present application.

To simplify the drawings, only parts related to the corresponding embodiments are schematically shown in the figures. They do not represent the actual structure as products. Additionally, to make the drawings concise and easy to understand, some components with the same structure or function are only schematically depicted in part. There may actually be more or fewer components with the same structure or function.

In the present disclosure, unless explicitly stated otherwise, ordinal numbers such as "first" and "second" are used to distinguish associated objects and do not indicate relative importance or sequence; in addition, they do not represent the quantity of associated objects. "Multiple" includes two or more, and other quantifiers are similar. "/" is used to describe the relationship between associated objects, indicating an "or" relationship. "And/or" is used to describe the relationship between associated objects, including any combination relationship among them, such as "a and/or b" includes: "a alone," "b alone," or "a and b." "One or more" or "at least one" of multiple objects means any one or any combination of multiple objects, such as "one or more of a1, a2, a3" or "at least one of a1, a2, a3" includes: "a1 alone," "a2 alone," "a3 alone," "a1 and a2," "a1 and a3," "a2 and a3," or "a1, a2, and a3."

Recent advances in precision oncology, including immunotherapy and antibody-drug conjugates, have shown great potential in prolonging the survival of cancer patients. To formulate the right treatment strategies, these advances are often accompanied by careful examination of patient information, such as high-throughput sequencing and companion diagnostics. Such examinations greatly benefit from artificial intelligence (AI) and deep learning (DL) models, which provide quantitative details of biomarker expression.

In the treatment of metastatic breast cancer, human epidermal growth factor receptor 2 (HER2) plays an important role in protein-targeted therapy. The HER2-targeted monoclonal antibody drug trastuzumab (trade name: Herceptin) has become a mature first-line treatment for HER2-positive patients, significantly reducing the risk of disease progression and death compared to chemotherapy alone. Evaluating HER2 expression involves immunohistochemical (IHC) staining and in situ hybridization tests if the former is considered ambiguous. However, recent studies have shown that clinical HER2 interpretation may be compromised by lower consistency of judgement among pathologists, and that agreement among pathologists is more likely with the help of several artificial intelligence algorithms. The urgent need for AI adaptation in HER2 expression analysis is evident.

There are still some challenges in developing AI systems for HER2 expression evaluation. Firstly, the deep learning models integrated into such systems must be data-driven, but medical images are often scarce resources for a single institution. More critically, patient privacy policies prohibit data sharing across institutions, making it impossible to train deep learning models in the traditional way. Fortunately, emerging federated learning (FL) enables medical institutions to collectively develop deep learning models while maintaining patient privacy. Specifically, in the FL strategy, multiple institutions use their own data to train models in parallel and then pass the model parameters to each other during iterations. This technique has proven to significantly improve the generalizability of various deep learning models for medical imaging.

Secondly, although FL applications have achieved success in computed tomography and magnetic resonance imaging, the performance of DL models dedicated to histological images may be hindered due to imaging differences among institutions. Histological images, such as IHC staining required for HER2 expression evaluation, consist of color channels convolved by pixel-level intensities of hematoxylin (H&E) and diaminobenzidine (DAB). The color components of these stains are largely influenced by the laboratory conditions of sample preparation. Although pathologists have clearly observed staining color variations, DL models strictly using color channels as input can hardly detect them. Therefore, trained models may become less performant and biased towards partial data sources.

Please refer to FIG. 1, which shows a schematic diagram of a whole-slide tissue image processing method provided in an embodiment of the present disclosure. In one embodiment, as shown in FIG. 1, a whole-slide tissue image processing method for evaluating the expression level of HER2 in a target image includes the following steps:

S100 (Step a): Obtaining a target image/target tissue image, preferably whole-slide imaging (WSI) immunohistochemical imaging.

S200 (Step b): Obtaining a dataset, enhancing the staining components of the dataset, and using the enhanced dataset for federated learning to construct a tumor segmentation model.

It is worth noting that the datasets obtained from different institutions are first subjected to stain composition augmentation (SC augmentation) operations. Through federated learning technology, the enhanced datasets are used to construct a tumor segmentation model. Federated learning is a machine learning technique, specifically involving the training of algorithms on multiple distributed edge devices or servers with local data samples. This method is significantly different from traditional or prior centralized machine learning techniques that upload all local datasets to a single server, and more classic decentralized methods that typically assume local data samples are identically distributed. However, the federated learning of the present disclosure allows multiple participants to build a common, robust machine learning model without sharing data, thereby addressing critical issues such as data privacy, data security, data access rights, and heterogeneous data access. Therefore, using federated learning technology, reliable models can be trained on data collected from users while ensuring user data privacy. The dataset includes several test images, and the test images are immunohistochemical images.

Specifically, the datasets, which are obtained from National Taiwan University Hospital (NTUH) and Warwick University, are performed staining component enhancement locally and uploaded the enhanced datasets to the federated learning server and been used to construct a tumor segmentation model through federated learning operations. The tumor segmentation model can automatically detect the tumor location and boundary in medical images, segment tumor areas from normal areas, and quantify the size, volume, and characteristics of tumors, assisting doctors in quickly and accurately identifying tumors in patients.

S300 (Step c): Inputting the target image into the tumor segmentation model to determine the tumor area within the target image. Since the target image or target tissue image includes not only tumor areas but also normal areas, the purpose of this disclosure is to evaluate the expression level of human epidermal growth factor receptor 2 (HER2). Therefore, it is necessary to determine the tumor area within the target image or target tissue image in advance. It is worth knowing that although the present disclosure only reveals the use of the method to evaluate the expression level of HER2, those people have an ordinally skilled in the art can understand the necessary technical means from the present disclosure to further apply the method to evaluate the expression levels of other genes or protein. Therefore, using the method disclosed herein to evaluate the expression levels of other genes in target tissue images should also be considered within the scope of this disclosure.

S400 (Step d): Performing cell membrane staining detection on the tumor area, classifying the tumor area based on the integrity of the cell membrane and the level of staining, and grading based on the classification result. Specifically, the tumor area can be subdivided into negative, faint, weak, and strong based on staining results. The integrity of the cell membrane can be divided into complete and incomplete. These combinations result in seven classification results: negative, faint-incomplete, faint-complete, weak-incomplete, weak-complete, strong-incomplete, and strong-complete.

The whole-slide image processing method in the present disclosure constructs a tumor segmentation model through staining component enhancement, making the model more compatible with target images from different institutions and accurately presenting the tumor area. Then, by performing cell membrane staining detection on the tumor area, the method classifies the level of HER2 in the target image. This method can accurately evaluate the expression level of HER2 in the target image and optimize target images obtained from different institutions, achieving cross-institutional model training without compromising user privacy.

Figure 2:
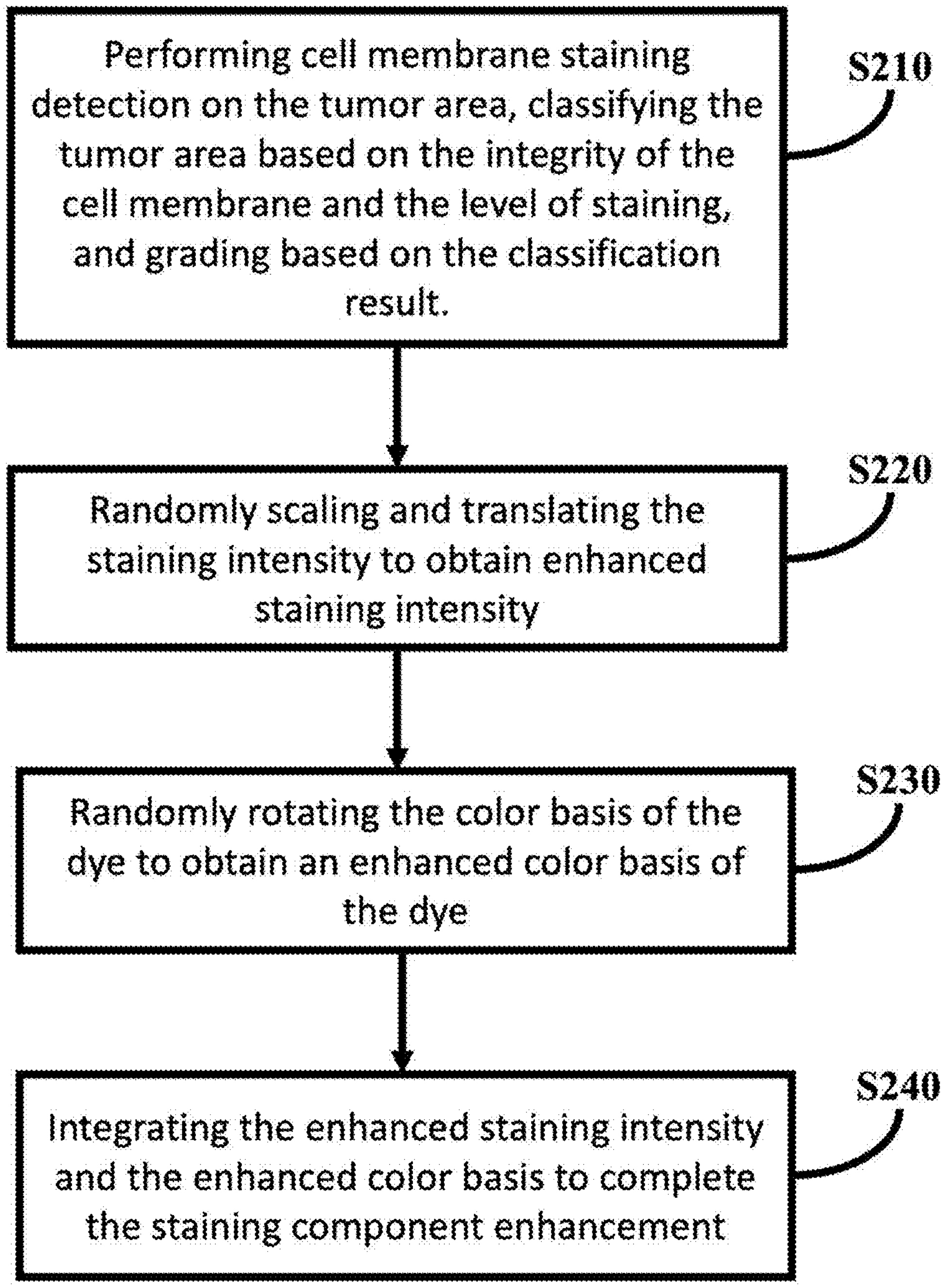
FIG. 2 is another schematic diagram of a fully loaded slide tissue image processing method in the embodiment of the present invention.

Please refer to FIG. 2, which shows another schematic diagram of a whole-slide image processing method provided in an embodiment of the present disclosure. In one embodiment, the step "obtaining a dataset and enhancing the staining components" further includes the following step:

S210: Obtaining test images in the dataset, performing color deconvolution on the test images to obtain the color basis and staining intensity of the dye.

In general, staining component enhancement is an augmentation technique that expands the data distribution coverage during model training by simulating various histological images based on source images. Due to the differences in staining intensity and dye color composition between institutions, staining component enhancement is needed to eliminate these differences as much as possible. Ideally, pixels in the images are only stained by two dyes, such as H&E and DAB in IHC images. The staining component enhancement technique uses these two dyes to generate enhanced images that better fit the distribution of histological data compared to general RGB image augmentation. Specifically, first obtaining test images in the dataset and performing color deconvolution on the test images. For a given input IHC image, staining component enhancement calibrates its H&E and DAB channels through color deconvolution. Decomposing image X into its dye color basis S and corresponding staining intensity A: $T(X)=A*S$, where T transforms the image into optical density space, S consists of unit-length row vectors representing the color components of H&E and DAB and an orthogonal background vector.

S220: Randomly scaling and translating the staining intensity to obtain enhanced staining intensity;

Next, the intensity $A_{ij}$ of each dye spot j and pixel i is scaled by a random factor $\alpha_j$ and shifted by a random offset $\beta_j$: $A'_{ij}=A_{ij}*\alpha_j+\beta_j$.

S230: Randomly rotating the color basis of the dye to obtain an enhanced color basis of the dye.

In addition, the color component $S_j$ of each dye spot j is affected. Assuming $(1, \phi(S_j), \theta(S_j))$ is the spherical coordinate of $S_j$, it is randomly rotated by angular displacements: $\phi(S'_j)=\phi(S_j)+\delta\phi_j$, $\theta(S_j)=\delta\theta(S_j)+\delta\theta_j$. The angles $\phi(S'_j)$ and $\theta(S'_j)$ are then constrained between 0 and $\pi/2$, so the perturbed color component $S_j$ remains in the valid optical density space. This perturbation randomly changes the color gamut of H&E and DAB around the original IHC image. All scaling $\alpha_j$, translation $\beta_j$, and rotation parameters $\delta\phi_j$ and $\delta\theta_j$ are randomly sampled from a uniform distribution with some predetermined range.

S240: Integrating the enhanced staining intensity and the enhanced color basis to complete the staining component enhancement.

After integration, the enhanced image becomes: $X'=T^{-1}(A'*S')$, completing the staining component enhancement. The effectiveness of the staining component enhancement technique can be evaluated using the Camelyon17 dataset. The Camelyon17 dataset contains thousands of high-resolution breast cancer tissue slice images from different cases, some of which contain cancerous areas while others are normal tissues. Researchers can use these images to train and test deep learning models to automatically detect and identify cancerous areas, helping doctors to make faster and more accurate diagnoses and treatment plans. Through this dataset, it can be verified that the staining component enhancement technique in this application can bridge the distribution gap of histological images, improving the stability and generalization of transfer classification models trained using federated learning.

In one embodiment, the step "using the enhanced dataset for federated learning to construct the tumor segmentation model" further includes the following steps: Preprocessing several enhanced datasets, inputting the preprocessing results into the federated learning server to construct the tumor segmentation model; preprocessing is used to reduce the data volume input into the federated learning server.

Specifically, preprocessing several enhanced datasets does not require uploading the original data (i.e., several enhanced datasets) to the federated learning server. Instead, mapping results or updates related to the original data are registered on the federated learning server. Compared to directly uploading the original data to the federated learning server, uploading the processed data helps reduce the load on the federated learning server while preserving the security of the original data, thus avoiding the leakage of some privacy content in the original data.

In one embodiment, the step "preprocessing several enhanced datasets and inputting the preprocessing results into the federated learning server to construct the tumor segmentation model" further includes the following steps:

Step "Constructing a local model and a global model based on the learning rules of the federated learning server."

Step "Training the local model with several enhanced datasets to obtain the parameters of the local models." Specifically, the several enhanced datasets can come from different sources, such as the aforementioned NTUH and Warwick University. Locally training the local models based on them, obtaining the parameters of the local models, which can be weights, biases, etc., related to the original data.

Step "Inputting the parameters of the local models into the federated learning server, training the global model through a clustering pipeline." In federated learning, a clustering pipeline refers to a set of processes or methods for clustering data in a distributed environment. After inputting the parameters of the local models into the federated learning server, the federated learning server is responsible for aggregating the parameters of the local models to obtain a global clustering model. Both the local model and the global model are based on federated learning rules.

Step "Training the global model with several enhanced datasets, inputting the parameters of the trained global model into the federated learning server to construct the tumor segmentation model." Specifically, after training the global model with the federated learning server, the global model is distributed back to each local site. Each local site retrains the global model based on several enhanced datasets and inputs the parameters obtained from the training into the federated learning server. This training process iterates repeatedly until the global model trained by the federated learning server meets certain preset requirements and stops. The trained global model is the required tumor segmentation model.

Figure 3:
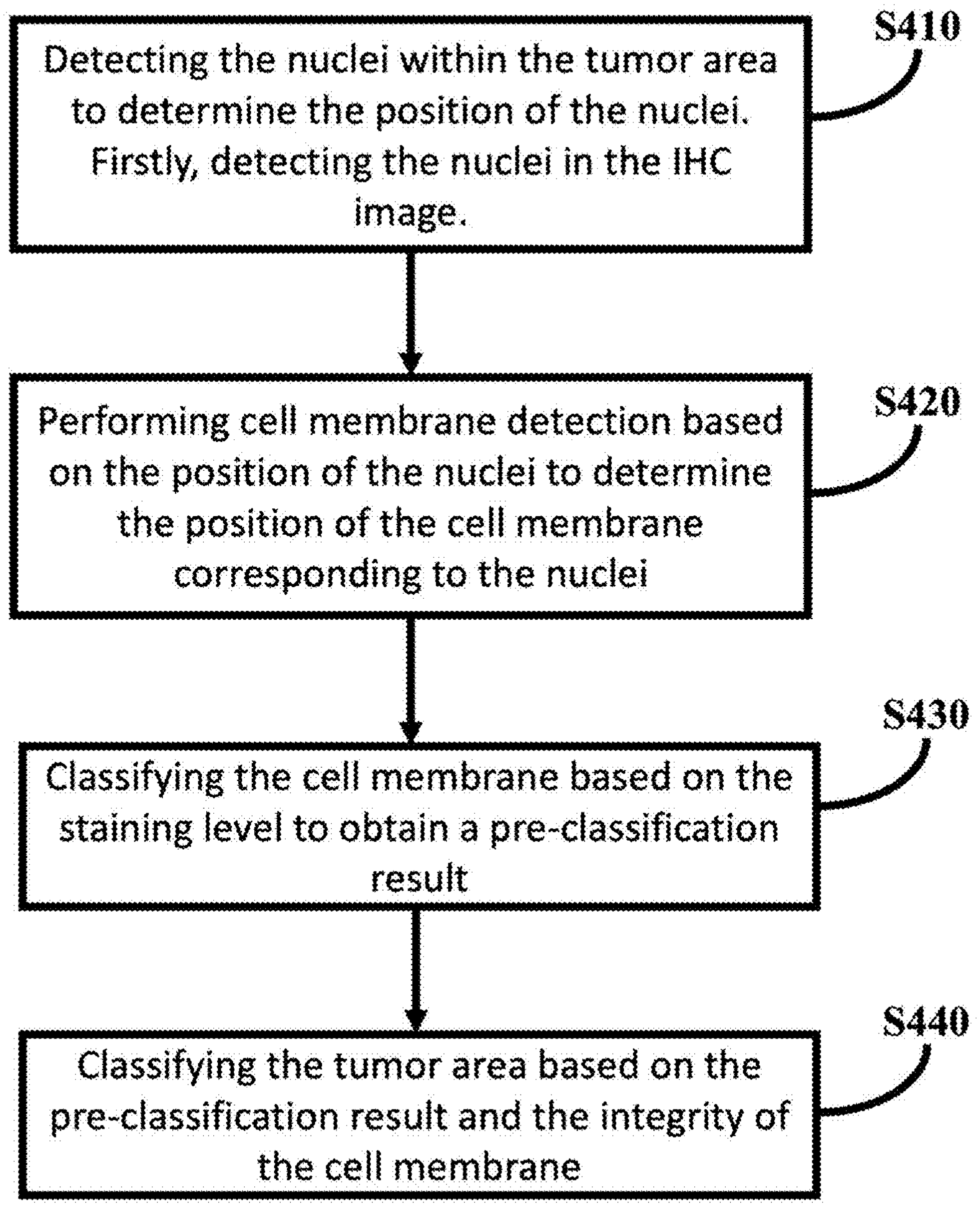
FIG. 3 is the other schematic diagram of a fully loaded slide tissue image processing method in the embodiment of the present invention.

Please refer to FIG. 3, which shows another schematic diagram of a whole-slide image processing method provided in an embodiment of the present application. In one embodiment, the step S400 (Step d) "performing cell membrane staining detection on the tumor area, classifying the tumor area based on the integrity of the cell membrane and the level of staining" further includes the following steps:

S410 (Step d1): Detecting the nuclei within the tumor area to determine the position of the nuclei. Firstly, detecting the nuclei in the IHC image. The scalar feature of each pixel is calculated by combining hue, saturation, value, and RGB intensity variance. The segmentation mask of the nuclei is generated on this scalar feature through Otsu thresholding. In addition, the segmentation of the nuclei is divided into segmentation masks for each nucleus through two consecutive splitting processes, each involving connected component analysis, local peak detection, and watershed algorithm. Uncovered nuclear components are further filtered based on their size and roundness.

S420 (Step d2): Performing cell membrane detection based on the position of the nuclei to determine the position of the cell membrane corresponding to the nuclei. Specifically, expanding the segmentation mask of the nucleus based on the position of the nucleus to determine the position of the cell membrane corresponding to the nucleus. For nuclei detected in the IHC image, the segmentation mask of each nucleus is first expanded to obtain its membrane area. Based on approximating the membrane as a hexagonal stacking of circular objects, the expansion degree is dynamically calculated.

S430 (Step d3): Classifying the cell membrane based on the staining level to obtain a pre-classification result. Specifically, performing color deconvolution on each pixel of the cell membrane to convert it to a H&E-DAB representation; classifying each pixel of the cell membrane based on its staining intensity in the DAB channel according to a preset threshold to obtain the classification level of each pixel; obtaining the pre-classification result based on the classification level of each pixel. Each nuclear membrane area is classified based on its staining level. Pixels within the membrane area are converted to a H&E-DAB representation through color deconvolution. Subsequently, they are divided into negative, faint, weak, and strong levels based on three preset thresholds in the DAB channel, which is the pre-classification result. Each membrane is classified as the strongest staining level with sufficient pixels in the membrane area.

S440 (Step d4): Classifying the tumor area based on the pre-classification result and the integrity of the cell membrane. Specifically, using a skeletonization algorithm to obtain the integrity of the cell membrane;

refining the pre-classification result based on the integrity of the cell membrane to classify the tumor area. Membrane areas are further classified based on staining integrity to obtain classification results: negative, faint-incomplete, faint-complete, weak-incomplete, weak-complete, strong-incomplete, and strong-complete. For each membrane, a skeletonization algorithm is applied to pixels corresponding to the membrane area staining level and one level weaker. The skeleton contour is then processed through subsequent closing operations. If the skeleton contour is closed and encloses significant areas of the membrane, the membrane is classified as complete; otherwise, it is considered incomplete.

In one embodiment, grading the classification results through preset standards. Preset standards include the ASCO CAP 2018 guidelines. The whole-slide image processing method includes: based on the ASCO CAP 2018 guidelines and classification results, determining the level of HER2 in the target image. Specifically, the American Society of Clinical Oncology (ASCO) and the College of American Pathologists (CAP) jointly issued guidelines for cancer diagnosis and treatment in 2018 to provide the latest diagnostic and treatment recommendations for doctors and pathologists. The classification results obtained can be used to determine the level of HER2 in the target image as 0, 1+, 2+, or 3+ according to the guidelines.

Based on the same technical concept, the present disclosure also provides and embodiment of a tissue image processing system on whole-slide imaging, including a memory, a processor, and a computer program stored on the memory, wherein the processor executes the computer program to implement the steps of the whole-slide image processing method in the embodiments.

The whole-slide image processing system disclosed in this disclosure constructs a tumor segmentation model through staining component enhancement, making the model more compatible with target images from different institutions and accurately presenting the tumor area. Then, by performing cell membrane staining detection on the tumor area, the system classifies the level of HER2 in the target image. This system can accurately evaluate the level of HER2 in the target image and optimize target images obtained from different institutions, achieving cross-institutional model training without compromising user privacy.

Based on the same technical concept, the present disclosure further provides a computer program product (e.g., computer-readable recording medium), including a computer program/instructions, wherein the computer program/instructions, when executed by a processor, implement the steps of the whole-slide image processing method in the embodiments.

In the above embodiments, the descriptions of each embodiment focus on different aspects. Parts that are not described or recorded in detail in one embodiment can refer to the relevant descriptions of other embodiments. In addition, the above embodiments can be freely combined as needed.

The invention claimed is:

1. A tissue imaging processing method, comprising:

(a) obtaining a target image;

(b) obtaining a dataset, enhancing the staining components of the dataset, and using an enhanced dataset for federated learning to construct a tumor segmentation model, wherein the dataset includes a test image, and the test image is an immunohistochemical image;

(c) inputting the target image into the tumor segmentation model to determine a tumor area within the target image;

(d) performing cell membrane staining detection on the tumor area, and further classifying the tumor area based on an integrity of the cell membrane and a staining level of the cell membrane; and (e) grading based on the classification result;

wherein enhancing the staining components of the dataset comprises:

(i) obtaining the test image in the dataset, performing color deconvolution on the test image to obtain a color basis and staining intensity of a dye in the test image;

(ii) randomly scaling and randomly translating the staining intensity of the dye to obtain an enhanced staining intensity of the dye;

iii) randomly rotating the color basis of the dye to obtain an enhanced color basis of the dye; and (iv) integrating the enhanced staining intensity and the enhanced color basis of the dye to complete the enhancement of the staining components.

2. The tissue imaging processing method according to claim 1, wherein the step of using the enhanced dataset for federated learning to construct the tumor segmentation model further comprises preprocessing the enhanced dataset, and inputting the preprocessing result into a federated learning server to construct the tumor segmentation model.

3. The tissue imaging processing method according to claim 2, wherein the step of preprocessing the enhanced dataset and inputting the preprocessing results into the federated learning server to construct the tumor segmentation model further comprises: constructing a local model and a global model based on the learning rules of the federated learning server; training the local model with the enhanced dataset to obtain a plurality of parameters of the local model; inputting the plurality of parameters of the local model into the federated learning server, training the global model through a clustering pipeline; and training the global model with the enhanced dataset, inputting a parameter of the trained global model into the federated learning server to construct the tumor segmentation model.

4. The tissue imaging processing method according to claim 1, wherein Step (d) further comprises: (d1) performing nuclear detection on the tumor area to determine a position of a nucleus within the tumor area; (d2) performing cell membrane detection based on the position of the nucleus to determine a position of a cell membrane corresponding to the nucleus; (d3) classifying the cell membrane based on a staining level of the cell membrane to obtain a pre-classification result; and (d4) classifying the tumor area based on the pre-classification result and the integrity of the cell membrane.

5. The tissue imaging processing method according to claim 4, wherein Step (d2) further comprises enlarging the segmentation mask of the nucleus based on the position of the nucleus to determine the position of the cell membrane corresponding to the nucleus.

6. The tissue imaging processing method according to claim 1, wherein Step (d3) further comprises: performing color deconvolution on each pixel of the cell membrane to convert it to a representation in hematoxylin-diaminobenzidine; classifying each pixel of the cell membrane based on its staining intensity in the diaminobenzidine channel according to a preset threshold to obtain the classification level of each pixel; and obtaining the pre-classification result based on the classification level of each pixel.

7. The tissue imaging processing method according to claim 4, wherein Step (d4) further comprises: obtaining the integrity of the cell membrane using a skeletonization algorithm; and refining the pre-classification result based on the integrity of the cell membrane to classify the tumor area.

8. A tissue imaging processing system, comprising: a memory, a processor, and a computer program stored on the memory, wherein the processor executes the computer program to implement the steps of the tissue imaging processing method according to claim 1.

9. A non-transitory computer-readable recording medium for processing tissue imaging, comprising computer programs/instructions, wherein the computer programs/instructions, when executed by a processor, implement the method according to claim 1.

* * * * *